2,795,610

HYDROXY-PHENYL ALKYL UREAS

Henry J. Gerjovich, Wilmington, Del., assignor to E. I. du Pont de Nemours and Company, Wilmington, Del., a corporation of Delaware No Drawing. Application March 31, 1955, Serial No. 498,447

1 Claim. (Cl. 260—553)

This invention relates to certain hydroxy (or mercapto) phenyl, lower alkyl ureas and salts thereof. More specifically, it relates to compounds represented by the formula (1) 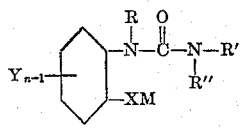

where X is oxygen or sulfur, M is hydrogen, alkali metal (e. g., sodium and potassium), alkaline earth metal (e. g., calcium and barium), or nitrogenous base (e. g., ammonium, dimethyl ammonium, trimethyl-ammonium, triethyl ammonium, and pyridinium), Y is methyl or nitro, $n$ is a positive integer less than 4, and, at least one of R, R' and R" is an aliphatic radical of 1 to 4 carbon atoms, and the others are hydrogen or aliphatic radical of 1 to 4 carbon atoms, said aliphatic radical preferably being alkyl and most preferably methyl.

The compounds of the invention can be prepared by several methods, for example, by the reaction of an appropriately substituted aniline with (1) an isocyanate (Equation 2 below), or (2) a carbamyl chloride (Equation 3 below), or (3) by the opening of a benzoxazolone ring with a primary or secondary amine (Equation 4 below). While the processes are illustrated below with respect to specific reactants, it will be understood that by suitable choice of reactants, other compounds of the invention can be similarly prepared.

(2) 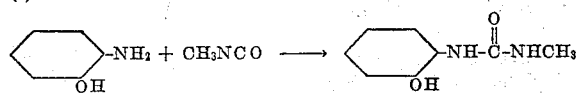

(3) 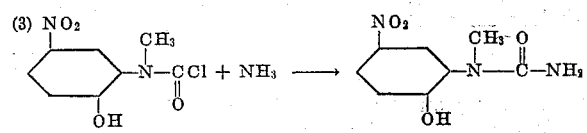

(4) 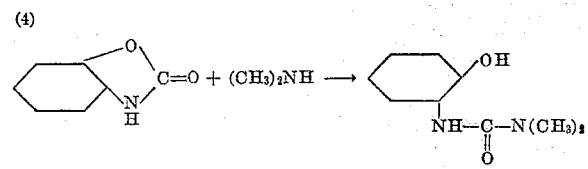

Salts of the ureas of this invention are prepared by reacting the urea compound with stoichiometric amount of a base in a solvent such as water or alcohol. The solvent is evaporated to obtain the dry salt. Equation 5 below illustrates:

(5) 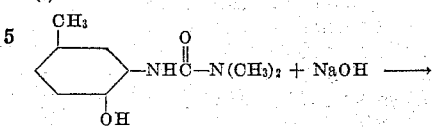
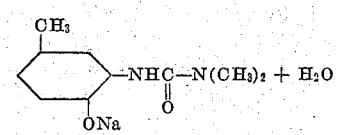

Reactions of the kind illustrated by Equations 2 and 3 above are preferably carried out in an inert solvent such as xylene, toluene or dioxane at a temperature in the range of about 15–130° C. Generally in processes in which a carbamyl chloride is used as a reactant, it is advantageous to use an acid acceptor, for example, a tertiary amine such as pyridine, triethylamine, or the like. In carrying out a reaction of the kind illustrated by Equation 4 above, the desired amine is preferably dissolved in dry methanol or ethanol to give a more satisfactory benzoxazolone ring opening. Processes of the kind illustrated by Equation 4 are generally carried out at a temperature in the range of about 15° C. to 100° C. The preparation of compounds of the invention by each of the processes illustrated above is described in detail in examples given hereinafter.

The compounds of the invention are generally solids melting in the range of from 50° C. to 250° C. with some evidence of decomposition at the melting point. They are usually white with the exception of nitro substituted compounds which are slightly yellow in color. The hydroxy and mercapto compounds of the invention are relatively insoluble in water but their salts obtained with inorganic bases or nitrogenous bases are relatively soluble in water.

The compounds of the invention have useful fungicidal, protozoicidal and algaecidal properties. If desired, they can for application for such purposes be admixed in the conventional manner with dusts, liquids, and surface active agents such as wetting, dispersing, and emulsifying agents. In other words, they can be suitably admixed with a carrier material or conditioning agent of the kind used and referred to in the art as a pest control adjuvant or modifier in order to provide formulations adapted for ready and efficient application for the intended purpose using conventional applicator equipment.

Detailed examples follow to illustrate compounds of the invention, their preparation, and utility.

Example 1

A mixture of 12.5 parts by weight of o-aminobenzenethiol with 5.7 parts by weight of methylisocyanate contained in 150 parts by weight of dry benzene was heated at reflux temperature for a period of 2 hours under anhydrous conditions. A solid crystallized out of solution by reducing the volume of the benzene filtrate to about one-half its original volume. Subsequent recrystallization of this solid from fresh benzene gave 8.5 parts by weight of 1-(2-mercaptophenyl)-3-methylurea, M. P. 104°–106° C.

*Analysis.*—Calc'd. for $C_8H_{10}N_2OS$: N, 15.4; S, 17.6. Found: N, 15.49; S, 17.34.

The compound of this example has valuable fungicidal, protozoicidal and algaecidal properties. For example, an aqueous suspension of this compound containing only 0.2% by weight of the compound was applied to tomato foliage and this treatment prevented completely any injury to the tomato plants from a subsequent infestation of early blight fungus (*Alternaria solani*) which severely injured like tomato plants not so treated with the compound.

The compound of this invention also exhibits outstanding preventive fungitoxic activity against apple scab fungus (*Venturia inaequalis*). For example, an aqueous suspension of the compound but containing only 0.04% by weight of the compound was applied to foliage of apple trees to the run-off point. After the deposit had dried, the foliage was inoculated with the apple scab fungus. Twelve days later when readings were made, the treated foliage showed no evidence of fungus injury whereas untreated foliage showed serious damage.

As an illustration of the activity of the compound against protozoa, the compound of this example completely inhibited *Herpetomonas culicidarum* in a concentration of 16 parts per million of the compound.

*Example 2*

5.7 parts by weight of methyl isocyanate, 15.4 parts of weight of 2-amino-4-nitrophenol, and 150 parts by weight of dry dioxane were combined at room temperature and stirred for a period of 2 hours at 45–50° C. under anhydrous conditions. 3-(2-hydroxy-5-nitrophenyl)-1-methylurea crystallized from the solution, yield 85%, melting point 232°–234° C. (dec.).

*Analysis.*—Calc'd. for $C_8H_9N_3O_4$: N, 19.90. Found: N, 19.85.

A water dispersible powdered composition of the compound of this example adapted for application either as a dust or in aqueous suspension for the control of fungi, algae, or protozoa is obtained by intimately mixing and blending the ingredients shown below using conventional mixing equipment and then grinding to give a powder having an average particle size less than about 50 microns.

| | Percent |
|---|---|
| 3-(2-hydroxy-5-nitrophenyl)-1-methylurea | 80. |
| Sodium alkyl naphthalene sulfonate (wetting agent) | 1.5 |
| Methyl cellulose, low viscosity (dispersing agent) | 0.25 |
| Fuller's earth (diluent powder) | 18.25 |
| | 100 |

*Example 3*

13.5 parts by weight of benzoxazolone dissolved in 100 parts by weight of anhydrous ethanol was treated with an excess of dry dimethylamine at reflux temperature until saturated. The ethanol solvent was removed under reduced pressure and the residue, 3-(2-hydroxyphenyl)-1,1-dimethylurea, dimethyl ammonium salt, was dissolved in 500 parts by weight of water. 3-(2-hydroxyphenyl)-1,1-dimethylurea crystallized out of the aqueous solution upon adjusting this solution with hydrochloric acid to a pH of 6.0. The solid product was washed with water, dried in an oven at 80° C. to give an 86% yield, M. P. 135°–136.5° C.

*Analysis.*—Calc'd. for $C_9H_{12}N_2O_2$: N, 15.55. Found: N, 15.50.

The compound of this example was valuable fungicidal, protozoicidal and algaecidal properties. For example, an aqueous suspension of this compound containing only 0.2% by weight of the compound was applied to tomato foliage and this treatment prevented completely any injury to the tomato plants from a subsequent infestation of early blight fungus (*Alternaria solani*) which severely injured like tomato plants not so treated with the compound.

The compound of this invention also exhibits outstanding preventive fungitoxic activity against apple scab fungus (*Venturia inequalis*). For example, an aqueous suspension of the compound but containing only 0.2% by weight of the compound was applied to foliage of apple trees to the run-off point. After the deposit had dried, the foliage was inoculated with the apple scab fungus. Twelve days later when readings were made, the treated foliage showed no evidence of fungus injury whereas untreated foliage showed serious damage.

The algaecidal properties of the compound of this example are illustrated by its completely inhibitory action against *Euglena gracilis* at a concentration of 200 parts per million of the compound.

*Example 4*

A total of 12.5 parts by weight of o-aminobenzenethiol, 7.1 parts by weight of ethylisocyanate and 150 parts by weight of dry benzene are combined and heated at reflux temperature under anhydrous conditions for a period of two hours. Upon cooling the reaction, essentially pure 1-(2-mercaptophenyl)-3-ethylurea is obtained by filtration.

The compound prepared as above is formulated in a dust composition by blending or mixing the ingredients shown below in the weight proportions shown and grinding the mix to give a composition having an average particle size less than about 50 microns.

| | Percent |
|---|---|
| 1-(2-mercaptophenyl)-3-ethylurea | 20 |
| Talc | 80 |
| | 100 |

The dust composition of this example is free-flowing and is easily broadcast over an area to be protected from fungus infestation. In application to tomato plants for the prevention of early blight, the dust composition is applied at a rate or dosage of about 30 pounds per acre.

*Example 5*

A total of 23.0 parts by weight of N-methyl-2-hydroxy-5-nitrocarbanilyl chloride, 10.1 parts by weight of triethylamine contained in 250 parts by weight of dioxane is treated with an excess of anhydrous ammonia gas under anhydrous conditions at a temperature of 30°–40° C. The entire reaction mixture is stirred for 2 hours at room temperature and diluted with two volumes of 5% hydrochloric acid. Essentially pure 1-(2-hydroxyphenyl)-1-methylurea is obtained by filtration followed by a subsequent water wash of the solid until acid-free.

The compound prepared as above is formulated in a powdered composition adapted for use in the preparation of a spray using either an oil, water or a combination of oil and water as a liquid diluent. The powdered composition containing the ingredients in the weight proportions shows below is made by conventional mixing and grinding operations.

| | Percent |
|---|---|
| 1-(2-hydroxyphenyl)-1-methylurea | 70 |
| Alkylated aryl polyether alcohol (wetting and dispersing agent) | 4 |
| Fuller's earth | 26 |
| | 100 |

A spray composition suitable for application to apple trees for the control of apply scab is obtained by the dispersion of the formulation of this example in water in the proportions of 3 pounds of the composition per hundred gallons of water.

*Example 6*

An excess of dimethylamine gas is added to a stirring and refluxing solution of 100 parts by weight of absolute ethanol containing 15.0 parts by weight of 4-nitrobenzoxazolone until saturated. The ethanol solvent is removed under reduced pressure and the residue diluted with 500 parts by weight of water and sufficient hydrochloric acid to adjust the mixture to a pH of 6.0. Essentially pure 3-(2-hydroxy-5-nitrophenyl)-1,1-dimethyl urea is obtained by filtration.

The compound prepared as above is formulated in a liquid or fluid composition shown below by thoroughly mixing and dispersing the compound and the conditioning agents in the organic diluent in the weight proportions shown.

| | Percent |
|---|---|
| 3-(2-hydroxy-5-nitrophenyl)-1,1-dimethyl urea | 25 |
| Long chain fatty alcohol sulfate (emulsifying agent) | 2 |
| Goulac (dispersing agent) | 3 |
| Kerosene | 70 |
| | 100 |

The liquid composition of this example is introduced into ponds or lakes in amount equivalent to about 50 parts per million for the control of algae such as those of the Scenedesmus and Chlorella species.

Example 7

A solution of 17.9 parts by weight of 1,1-dimethyl-3-(o-hydroxyphenyl)urea contained in 100 parts by weight of ethanol is treated with 4.0 parts by weight of sodium hydroxide contained in 100 parts by weight of ethanol. After thorough mixing the reaction mixture was evaporated to dryness to yield essentially pure 1,1-dimethyl-3-(o-hydroxyphenyl)urea, sodium salt.

A granular composition is obtained by mixing the sodium salt obtained above in combination with the ingredients shown below with water to form a paste. The paste is then extruded, dried, and ground to give granules of size in the range of about 1/32 to 1/4 inch diameter.

| | Percent |
|---|---|
| 1,1-dimethyl-3-(o-hydroxyphenyl)urea, sodium salt | 10 |
| Goulac (dispersing agent) | 3 |
| Hydrocarbon oil | 1 |
| Dextrin (binding agent) | 20 |
| Fuller's earth | 66 |
| | 100 |

The sodium salt of this example is water soluble and the above formulation is particularly suitable for introducing into stagnant or relatively quiescent bodies of water to inhibit the reproduction of algae. Ordinarily the composition is added in quantities sufficient to provide from about 30 to 50 parts per million of the sodium salt in the water.

Example 8

2-aminophenol and methylisocyanate are brought together in equimolar amounts in a body of benzene as a reaction medium and are therein reacted by heating at reflux temperature under anhydrous conditions for about 2 hours. 3-(o-hydroxyphenyl)-1-methylurea precipitates and is recovered from the reaction mass by filtration.

The compound of this example is formulated to provide a water dispersible powder by intimately mixing the ingredients listed below in the weight proportions shown using conventional mixing or blending equipment and then grinding the mixture to get a powder having an average particle size less than about 50 microns.

| | Percent |
|---|---|
| 3-(o-hydroxyphenyl)-1-methylurea | 80 |
| Sodium disulfonate of dibutyl phenylphenol (wetting and dispersing agent) | 2 |
| Bentonite | 18 |
| | 100 |

A spray composition for application to tomato plants for the control of late blight (*Phytophthora infestans*) is obtained by dispersing the formulation of this example in water in the proportion of 3 pounds of the formulation per 100 hundred gallons of water.

Example 9

2-amino-4-nitrobenzenethiol and methylisocyanate are brought together in equimolar amounts in a body of dioxane as a reaction medium and are therein reacted by heating at reflux temperature under anhydrous conditions for about 3 hours. 3-(2-mercapto-5-nitrophenyl)-1-methylurea precipitates and is recovered from the reaction mass by filtration.

The compound of this example can be formulated and used in a manner and for the purpose shown in Example 5.

Example 10

2-amino-4-methylphenol and methylisocyanate are brought together in equimolar amounts in a body of dioxane as a reaction medium and are therein reacted by heating at reflux temperature under anhydrous conditions for about 3 hours. 3-(2-hydroxy-5-methylphenyl)-1-methylurea precipitates and is recovered from the reaction mass by filtration.

The compound of this example can be formulated and used according to the teachings of Example 4.

Example 11

2-aminophenol and butylisocyanate are brought together in equimolar amounts in a body of benzene as a reaction medium and are therein reacted by heating at reflux temperature under anhydrous conditions for about 2 hours. 1-butyl-3-(o-hydroxyphenyl)urea precipitates and is recovered from the reaction mass by filtration.

The compound of this example can be admixed with conditioning or adjuvant materials as shown in Example 7 and applied in the manner and for the purpose there disclosed.

Example 12

2-amino-4,6-dinitrophenol and ethylisocyanate are brought together in equimolar amounts in a body of benzene as a reaction medium and are therein reacted by heating at reflux temperature under anhydrous conditions for about 2 hours. 3-(2-hydroxy-3,5-dinitrophenyl)-1-ethylurea.

The compound of this example can be formulated and used as shown in Example 8.

Example 13

A stoichiometric excess of anhydrous ammonia is introduced under anhydrous conditions at a temperature of 35°–45° C. into a solution in toluene of equimolar amounts of N-methyl-2-mercaptocarbanilyl chloride and triethylamine. After completing addition of the ammonia, the reaction mixture is stirred for 3 hours at about 25° C. and is then diluted with 5% hydrochloric acid to lower the pH of the mass to about pH 6.5. 3-(o-mercaptophenyl)-3-methylurea precipitates during the reaction, is removed by filtration, washed with water, and dried.

The compound of this example can be formulated as shown in Example 4 and applied in the manner and for the purpose there shown.

Example 14

A stoichiometric excess of anhydrous ammonia is introduced under anhydrous conditions at a temperature of 35°–45° C. into a solution in dioxane of equimolar amounts of N-methyl-2-mercapto-5-nitrocarbanilyl chloride and triethylamine. After completing addition of the ammonia, the reaction mixture is stirred for 3 hours at about 25° C. and is then diluted with 5% hydrochloric acid to lower the pH of the mass to about pH 6.5. 3-(2-mercapto-5-nitrophenyl)-3-methylurea precipitates during the reaction, is removed by filtration, washed with water, and dried.

The compound of this example can be formulated and used in the manner and for the purpose described in Example 6.

*Example 15*

A stoichiometric excess of anhydrous ammonia is introduced under anhydrous conditions at a temperature of 35°–45° C. into a solution in dioxane of equimolar amounts of N-butyl-2-hydroxycarbanilyl chloride and triethylamine. After completing addition of the ammonia, the reaction mixture is stirred for 3 hours at about 25° C. and is then diluted with 5% hydrochloric acid to lower the pH of the mass to about pH 6.5. 3-(2-hydroxyphenyl)-3-butylurea precipitates during the reaction, is removed by filtration, washed with water, and dried.

The compound of this example can be formulated as disclosed in Example 8 and can be applied and used for the purpose described in that example.

*Example 16*

A stoichiometric excess of anhydrous methylamine is introduced under anhydrous conditions at a temperature of 30°–35° C. into a solution in dioxane of equimolar amounts of N-methyl-2-hydroxycarbanilyl chloride and triethylamine. After completing addition of the methylamine, the reaction mixture is stirred for 3 hours at about 25° C. and is then diluted with 5% hydrochloric acid to lower the pH of the mass to about pH 6.5. 3-(2-hydroxyphenyl)-1,3-dimethylurea precipitates during the reaction, is removed by filtration, washed with water, and dried.

The compound of this example can be formulated and used as described in Example 5.

*Example 17*

A stoichiometric excess of anhydrous dimethylamine is introduced under anhydrous conditions at a temperature of 35°–45° C. into a solution in dioxane of equimolar amounts of N-methyl-2-hydroxycarbanilyl chloride and triethylamine. After completing addition of the dimethylamine, the reaction mixture is stirred for 3 hours at about 25° C. and is then diluted with 5% hydrochloric acid to lower the pH of the mass to about pH 6.5. 3 - (2 - hydroxyphenyl) - 3,1,1 - triethylurea precipitates during the reaction, is removed by filtration, washed with water, and dried.

The compound of this example can be mixed with the various conditioning agents or adjuvant materials as shown in Example 4 and applied in the manner and for the purpose there stated.

*Example 18*

A stoichiometric excess of anhydrous dimethylamine is introduced under anhydrous conditions at a temperature of 35°–45° C. into a solution in dioxane of equimolar amounts of N-methyl-2-mercaptocarbanilyl chloride and triethylamine. After completing addition of the dimethylamine, the reaction mixture is stirred for 3 hours at about 25° C. and is then diluted with 5% hydrochloric acid to lower the pH of the mass to about pH 6.5. 3-(2-mercaptophenyl)-3,1,1-trimethylurea precipitates during the reaction, is removed by filtration, washed with water, and dried.

The compound of this example can be admixed with conditioning agents and used as described in Example 8.

*Example 19*

A stoichiometric excess of anhydrous diallylamine is introduced under anhydrous conditions at a temperature of 35°–45° C. into a solution in dioxane of equimolar amounts of N-methyl-2-mercapto-5-nitrocarbanilyl chloride and triethylamine. After completing addition of the diallylamine, the reaction mixture is stirred for 3 hours at about 25° C. and is then diluted with 5% hydrochloric acid to lower the pH of the mass to about pH 6.5. 3-(2-mercapto-5-nitrophenyl)-3-methyl-1,1-diallylurea precipitates during the reaction, is removed by filtration, washed with water, and dried.

The compound of this example can be formulated and applied as described in Example 5.

*Example 20*

An excess of allylamine is added with agitation to a 15% solution of benzothiazolone in ethanol while heating the solution at reflux temperature until the solution is saturated with the amine. The ethanol solvent is then removed under pressure and the residue diluted with a large volume of water and with sufficient hydrochloric acid to adjust the aqueous mass to pH 6.0. Essentially pure 1-allyl-3-(o-mercaptophenyl)urea is obtained as a precipitate and is recovered by filtration and drying.

The compound of this example can be formulated and used in the manner and for the purpose described in Example 4.

*Example 21*

An excess of dimethylamine is added with agitation to a 15% solution of benzothiazolone in ethanol while heating the solution at reflux temperature until the solution is saturated with the amine. The ethanol solvent is then removed under pressure and the residue diluted with a large volume of water and with sufficient hydrochloric acid to adjust the aqueous mass to pH 6.0. Essentially pure 1,1-dimethyl-3-(o-mercaptophenyl)urea is obtained as a precipitate and is recovered by filtration and drying.

The compound of this example can be formulated with various additives as shown in Example 8 and applied in the manner and for the purpose described in that example.

*Example 22*

An excess of diallylamine is added with agitation to a 15% solution of benzothiazolone in ethanol while heating the solution at reflux temperature until the solution is saturated with the amine. The ethanol solvent is then removed under pressure and the residue diluted with a large volume of water and with sufficient hydrochloric acid to adjust the aqueous mass to pH 6.0. Essentially pure 1,1-diallyl-3-(o-mercaptophenyl)urea is obtained as a precipitate and is recovered by filtration and drying.

The compound of this example can be formulated and used as shown in Example 5.

*Example 23*

An excess of methylbutylamine is added with agitation to a 15% solution of benzoxazolone in ethanol while heating the solution at reflux temperature until the solution is saturated with the amine. The ethanol solvent is then removed under pressure and the residue diluted with a large volume of water and with sufficient hydrochloric acid to adjust the aqueous mass to pH 6.0. Essentially pure 1-butyl-3-(o-hydroxyphenyl) - 1 - methylurea is obtained as a precipitate and is recovered by filtration and drying.

The compound of this example can be formulated and used in the manner and for the purpose described in Example 5.

*Example 24*

An excess of dimethylamine is added with agitation to a 15% solution of 4-methylbenzoxazolone in ethanol while heating the solution at reflux temperature until the solution is saturated with the amine. The ethanol solvent is then removed under pressure and the residue diluted with a large volume of water and with sufficient hydrochloric acid to adjust the aqueous mass to pH 6.0. Essentially pure 1,1-dimethyl - 3 - (2 - hydroxy-5-methylphenyl)urea is obtained as a precipitate and is recovered by filtration and drying.

This compound can be formulated and applied to the manner shown in Example 6.

*Example 25*

An excess of dibutylamine is added with agitation to a 15% solution of benzoxazolone in ethanol while heating the solution at reflux temperature until the solution is saturated with the amine. The ethanol solvent is then removed under pressure and the residue diluted with a large volume of water and with sufficient hydrochloric acid to adjust the aqueous mass to pH 6.0. Essentially pure 1,1-dibutyl-3-(o-hydroxyphenyl)urea is obtained as a precipitate and is recovered by filtration and drying.

The compound of this example can be formulated by admixture with conditioning agents as disclosed in Example 4 and can be applied for the purpose there shown.

Example 26

3-(o-hydroxyphenyl)-1-methylurea prepared as in Example 8 is reacted with an equimolar proportion of sodium hydroxide in ethanol. After thorough mixing, the reaction mass is evaporated to dryness to give 3-(o-hydroxyphenyl)-1-methylurea, sodium salt.

The water soluble compound of this example can be formulated according to the teachings of Example 7 and introduced into ponds to provide about 50 parts per million of the compound for the control of algae.

Example 27

3-(o-mercaptophenyl)-1-methylurea prepared according to Example 1 is reacted with an equimolar proportion of potassium hydroxide in ethanol. After thorough mixing, the reaction mass is evaporated to dryness to give 3-(o-mercaptophenyl)-1-methylurea, potassium salt.

The water soluble compound of this example can be dissolved in water in amount of 3 pounds per hundred gallons along with a minor amount of a spreader-sticker material to provide an aqueous spray for application to apple trees for the control of apple scab.

Example 28

3-(o-mercaptophenyl)-1,1-dimethylurea prepared according to Example 21 is reacted with an equimolar proportion of sodium hydroxide in ethanol. After thorough mixing, the reaction mass is evaporated to dryness to give 3-(o-mercaptophenyl)-1,1-dimethylurea, sodium salt.

The sodium salt of this example can be introduced into water in a concentration of 20 to 40 parts per million for the control of algae such as the Scenedesmus and Chlorella.

Example 29

3-(o-hydroxyphenyl)-1,1-dimethylurea prepared according to Example 3 is reacted with an equimolar proportion of trimethylamine in ethanol. After thorough mixing, the reaction mass is evaporated to dryness to give 3-(o-hydroxyphenyl)-1,1-dimethylurea, trimethylammonium salt.

The ammonium salt of this example can be formulated and used in the manner and for the purpose disclosed in Example 7.

Example 30

3-(o-mercaptophenyl)-1-methylurea prepared according to Example 1 is reacted with an equimolar proportion of monomethylamine in methanol. After thorough mixing, the reaction mass is evaporated to drying to give 3-(o-mercaptophenyl)-1-methylurea, methylammonium salt.

A solution of the ammonium salt of this example in water in proportions of about 2 pounds of the compound per hundred gallons of water is useful for application to tomatoes for the control of early blight.

Example 31

3-(o-hydroxyphenyl)-3,1,1-trimethylurea prepared according to Example 17 is reacted with an equimolar proportion of dimethylamine in ethanol. After thorough mixing, the reaction mass is evaporated to dryness to give 3-(o-hydroxyphenyl) - 3,1,1 - trimethylurea, dimethylammonium salt.

The soluble compound of this example can be used in accordance with the use described in Example 7.

Other compounds of this invention, such as those illustrated below, are similarly prepared according to the methods described in the foregoing examples. They can be suitably admixed with a carrier material, conditioning agent, or modifier in order to provide formulations adapted for ready and efficient application for the control of fungi, protozoa, and algae using conventional applicator equipment:

3-(2-mercapto-5-methylphenyl)-3,1,1-trimethylurea, trimethylammonium salt
3-(2-hydroxy-4-methylphenyl)-3-methallyl-1,1-diethylurea
3-(2-mercaptophenyl)-3-propyl-1-butyl-1-methylurea
3-(2-hydroxy-3,5-dinitrophenyl)-3-ethyl-1,1-dimethylurea
3-(2-hydroxy-5-nitrophenyl)3,1,1-trimethylurea
3-(o-mercaptophenyl)3,1,1-trimethylurea, potassium salt
1-(o-hydroxyphenyl)-1,3-dipropylurea, ammonium salt
3-butyl-1-methyl-1-(2-mercapto-4-nitrophenyl)urea While the invention has been described with particular reference to specific embodiments, it will be appreciated that no unnecessary limitations are to be understood therefrom. The invention is not limited to the exact details shown and described for obvious modifications will occur to those skilled in the art.

I claim:
A compound represented by the formula

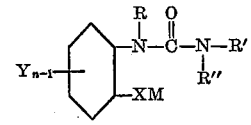

where X is selected from the group consisting of oxygen and sulfur, M is selected from the group consisting of hydrogen, alkali metal, alkaline earth metal, ammonium, monomethylammonium, dimethylammonium, trimethylammonium, triethylammonium and pyridinium, Y is selected from the group consisting of methyl and nitro, $n$ is a positive integer less than 4, and at least one of R, R' and R" is selected from the group consisting of allyl, methallyl, and alkyl radicals having from 1 to 4 carbon atoms inclusive and the others are selected from the group consisting of hydrogen, allyl, methallyl and alkyl radicals of 1 to 4 carbon atoms inclusive.

References Cited in the file of this patent

UNITED STATES PATENTS

| | | |
|---|---|---|
| 2,230,082 | Montenier | Jan. 28, 1941 |
| 2,651,620 | Hill | Sept. 8, 1953 |
| 2,663,730 | Hill | Dec. 22, 1953 |

OTHER REFERENCES

Rudolf: Journal für Praktische Chemie, Series II, vol. 48, pages 429–440.